United States Patent
Matsui et al.

(10) Patent No.: US 6,927,944 B2
(45) Date of Patent: Aug. 9, 2005

(54) BASE, DRUM, AND DRUM MOUNTING UNIT FOR MAGNETIC RECORDING REPRODUCING APPARATUS

(75) Inventors: Akira Matsui, Saitama (JP); Kimihiko Nakamura, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/682,190

(22) Filed: Oct. 10, 2003

(65) Prior Publication Data

US 2004/0075950 A1 Apr. 22, 2004

Related U.S. Application Data

(63) Continuation of application No. 09/812,547, filed on Mar. 21, 2001, now Pat. No. 6,643,102.

(30) Foreign Application Priority Data

Sep. 25, 2000 (JP) ........................................ 2000-290920

(51) Int. Cl.[7] ........................ G11B 21/04; G11B 21/18; G11B 5/52
(52) U.S. Cl. ................................................. 360/271.6
(58) Field of Search ........................... 360/271.6, 271.1, 360/271, 270, 240

(56) References Cited

U.S. PATENT DOCUMENTS

| | | | |
|---|---|---|---|
| 4,814,917 A | 3/1989 | Nonoyama | 360/271 |
| 5,021,908 A | 6/1991 | Morimoto et al. | 360/271.6 |
| 5,321,569 A | * 6/1994 | Sakai | 360/271.9 |
| 5,831,796 A | 11/1998 | Nishida | 360/271.6 |
| 6,151,191 A | * 11/2000 | Muftu et al. | 360/271.1 |
| 2001/0013995 A1 | 8/2001 | Jeong | 360/271 |

FOREIGN PATENT DOCUMENTS

JP 8-55318 * 2/1996

* cited by examiner

*Primary Examiner*—Julie Anne Watko
(74) *Attorney, Agent, or Firm*—Oblon, Spivak, McClelland, Maier & Neustadt, P.C.

(57) ABSTRACT

A tilt stand having a mounting surface and holes for mounting a drum are formed by one normal-feed press working. The holes for mounting the drum are formed by vertical punching. The respective holes are rectangular holes, each of which has one side equal to the diameter of a shaft or the diameter of a screw in the direction of Y. The hole into which the shaft is inserted has the other side in the direction of X which is determined such that the side is in contact with the shaft inserted into the hole in the direction perpendicular to the mounting surface at the obverse surface and the reverse surface of the mounting surface. The drum has a structure in which the shaft projects from the bottom and is positioned with respect to the mounting surface by inserting the shaft into the mounting hole. Three screw holes are formed near the shaft of the drum. The mounting angle of the drum with respect to the mounting surface is determined by the use of the mounting holes corresponding to these screw holes. Therefore, this can reduce the number of processes and the load of a press machine and increases the strength of a base without degrading the mounting accuracy of the drum and the accuracy of the linearity of a lead.

4 Claims, 7 Drawing Sheets

BASE, DRUM, AND DRUM MOUNTING UNIT FOR MAGNETIC RECORDING REPRODUCING APPARATUS

CROSS-REFERENCE TO RELATED APPLICATIONS

This application is a continuation of U.S. patent application Ser. No. 09/812,547, filed Mar. 21, 2001, now U.S. Pat. No. 6,643,102, the entire contents of which are incorporated herein by reference.

BACKGROUND OF THE INVENTION

1. Field of the Invention

The present invention relates to the base, drum, and drum mounting unit of a magnetic recording reproducing apparatus in which the drum is mounted in a magnetic recording reproducing apparatus such as video tape recorder or the like.

2. Related Art Statement

In a VTR (video tape recorder), a front loading system is sometimes adopted in which a tape cassette is approximately horizontally loaded into a deck from the front of the deck. In the front loading system, when a tape cassette is inserted into a cassette holder from the front of the deck, the cassette holder moves to a tape loading unit and loads the tape cassette into the tape loading unit. When the tape cassette is set in a predetermined position, a tape in the tape cassette is pulled out by the tape loading unit. The tape loading unit pulls out a tape in a cassette approximately parallel to the surface of a base and winds the tape around a drum.

In a helical scan system, recording and reproducing are performed by obliquely tracing the tape with a magnetic head provided on the drum and hence the drum is mounted on the base at a predetermined angle with respect to the base. The tape loading unit hooks the tape on a pair of tape pulling-out members (hereinafter referred to as "slider") and pulls out the tape from the tape cassette and moves these sliders to the vicinity of the other end of the drum mounted at the predetermined angle to reel the tape around the drum.

In order to mount the drum to a base at the predetermined angle with respect to the surface of the base, a tilt stand is formed in the same shape and same size as the bottom of the drum and is mounted on the base and the drum is fixed with screws at several points of the end portion of the tilt stand. In this way, the drum is tilted at a predetermined angle with respect to the surface of the base.

A normal-feed press process is adopted for machining the base. The normal-feed press process is also used for various openings and the tilt stand. However, the drum needs to be mounted with extremely high accuracy of the order of several micrometers. In order to enable the drum to be mounted with extremely high accuracy, a screw hole for regulating the position of the drum of the tilt stand portion and a receiving surface thereof for regulating the height of the drum need to be worked by a press process different from the normal-feed press process used for the other portions of the base. That is, those portions need to be press-worked in the state where the base is tilted in correspondence with the tilt angle of the tilt stand.

This presents a problem that the number of processes for machining the base increases. Here, it is also thought that the tilt stand is formed separately by a die casting method, but in this case, the number of processes further increases and the number of parts also increases.

Further, since a structure is adopted in which the drum is fixed with screws at several positions of the brim of the tilt stand, the drum mounting surface of the tilt stand is relatively large in size and the height of the tilt stand is also large. That is, the tilt stand needs to be subjected to a large bending by a press machine, which results in increasing the load of the press machine. Also, the area of an opening made in the base becomes large. This presents a problem that the strength of the base decreases.

Still further, a lead for guiding the tape is formed on the peripheral surface of the drum. There is a possibility that the lead is deformed when the drum is mounted on the tilt stand with screws. Therefore, in order to keep the linearity of the lead with sufficient accuracy, the surface of the tilt stand needs to be worked with extremely high accuracy, but it is very difficult to work the surface of the tilt stand with high accuracy.

As described above, in order to mount the drum with high accuracy, the tilt stand, on which the drum is mounted, needs to be formed by a press process different from the normal-feed press process, which presents a problem that the number of processes increases. Further, this presents problems that the load of the press machine increases and that the strength of the base decreases. Still further, in order to keep the linearity of the lead with sufficient accuracy, the accuracy of the surface of the tilt stand needs to be improved, which presents a problem that it is very difficult to work the surface of the tilt stand with high accuracy.

OBJECT AND SUMMARY OF THE INVENTION

An object of the present invention is to provide the base, drum, and drum mounting unit of a magnetic recording reproducing apparatus which can be made by a decreased number of processes by forming a tilt stand only by one normal-feed press process.

Another object of the present invention is to provide the base, drum, and drum mounting unit of a magnetic recording reproducing apparatus which can prevent a decrease in the mounting accuracy of the drum even if the drum is mounted on a tilt stand formed only by one normal-feed press process.

Further another object of the present invention is to provide the base, drum, and drum mounting unit of a magnetic recording reproducing apparatus which can prevent a decrease in the accuracy of the linearity of a lead by mounting the drum in the vicinity of the shaft of the drum.

Still further another object of the present invention is to provide the base, drum, and drum mounting unit of a magnetic recording reproducing apparatus which can reduce the load of the press machine by forming a tilt stand only by one normal-feed press process.

Still further another object of the present invention is to provide the base, drum, and drum mounting unit of a magnetic recording reproducing apparatus which can be increased in strength by reducing the size of an opening made in the tilt stand.

A base of a magnetic recording reproducing apparatus in accordance with the present invention includes a tilt stand having a drum mounting surface tilted with respect to a plane and not less than one mounting hole for mounting a drum which is punched in the mounting surface in the direction perpendicular to the plane.

A base of a magnetic recording reproducing apparatus in accordance with the present invention includes a tilt stand having a mounting surface tilted to mount a drum thereon and a shaft mounting hole which is formed in the mounting surface and into which a shaft of the drum is inserted to regulate the position of the drum on the mounting surface.

Further, a base of a magnetic recording reproducing apparatus in accordance with the present invention includes a tilt stand having a mounting surface tilted to mount a drum thereon, a shaft mounting hole which is formed in the mounting surface and into which a shaft of the drum is inserted, and not less than one mounting hole which is formed in the range of a diameter smaller than the diameter of the drum from the shaft mounting hole to mount the drum thereon.

Further, a base of a magnetic recording reproducing apparatus in accordance with the present invention includes a tilt stand having a mounting surface tilted to mount a drum thereon, a shaft mounting hole which is formed in the mounting surface and into which a shaft of the drum is inserted, and an opening which is formed in the mounting surface at a position lower than the shaft mounting hole and through which a connector fixed to the drum is exposed to the reverse surface of the base.

Further, a base of a magnetic recording reproducing apparatus in accordance with the present invention includes a tilt stand having a mounting surface tilted to mount a drum thereon, and a cut and bent portion which is formed by cutting and bending the base and retains the drum mounted on the tilt stand to provisionally fix the drum.

Further, a drum of a magnetic recording reproducing apparatus in accordance with the present invention includes a cylindrical fixing member for supporting a cylindrical rotary member provided with a head for tracing a tape on the peripheral surface thereof, a shaft being a rotational center of the cylindrical rotary member and projecting from the bottom of the cylindrical fixing member and being inserted into the first mounting hole formed in the mounting surface of a base to position the drum with respect to the mounting surface, and a fixing portion formed on the bottom of the cylindrical fixing member and fixed to the mounting surface by the use of the second mounting hole formed in the mounting surface to position the drum in the angular direction with respect to the mounting surface of the cylindrical fixing member.

Further, a drum of a magnetic recording reproducing apparatus in accordance with the preset invention includes a retaining portion having a shape corresponding to a cut and bent portion formed on a tilt stand of a case by cutting and bending the base, wherein the drum is provisionally mounted on the tilt stand by making the retaining portion retain the cut and bent portion.

Further, a drum mounting unit of a magnetic recording reproducing apparatus in accordance with the present invention includes a tilt stand formed on a base and having a mounting surface tilted with respect to a plane to mount a drum thereon, the first mounting hole and the second mounting hole which are punched in the mounting surface in a vertical direction with respect to the plane, a shaft which is a rotational center of the drum and a part of which projects from the bottom of the drum and is inserted into the first mounting hole to position the drum with respect to the tilt of the drum, and a fixing portion which is formed on the bottom of the drum and is fixed to the mounting surface by the use of the second mounting hole to position the drum in the angular direction with respect to the mounting surface.

The other features and advantages of the present invention will be made sufficiently clear by the following description.

DETAILED DESCRIPTION OF THE PREFERRED EMBODIMENTS

Figure 1:
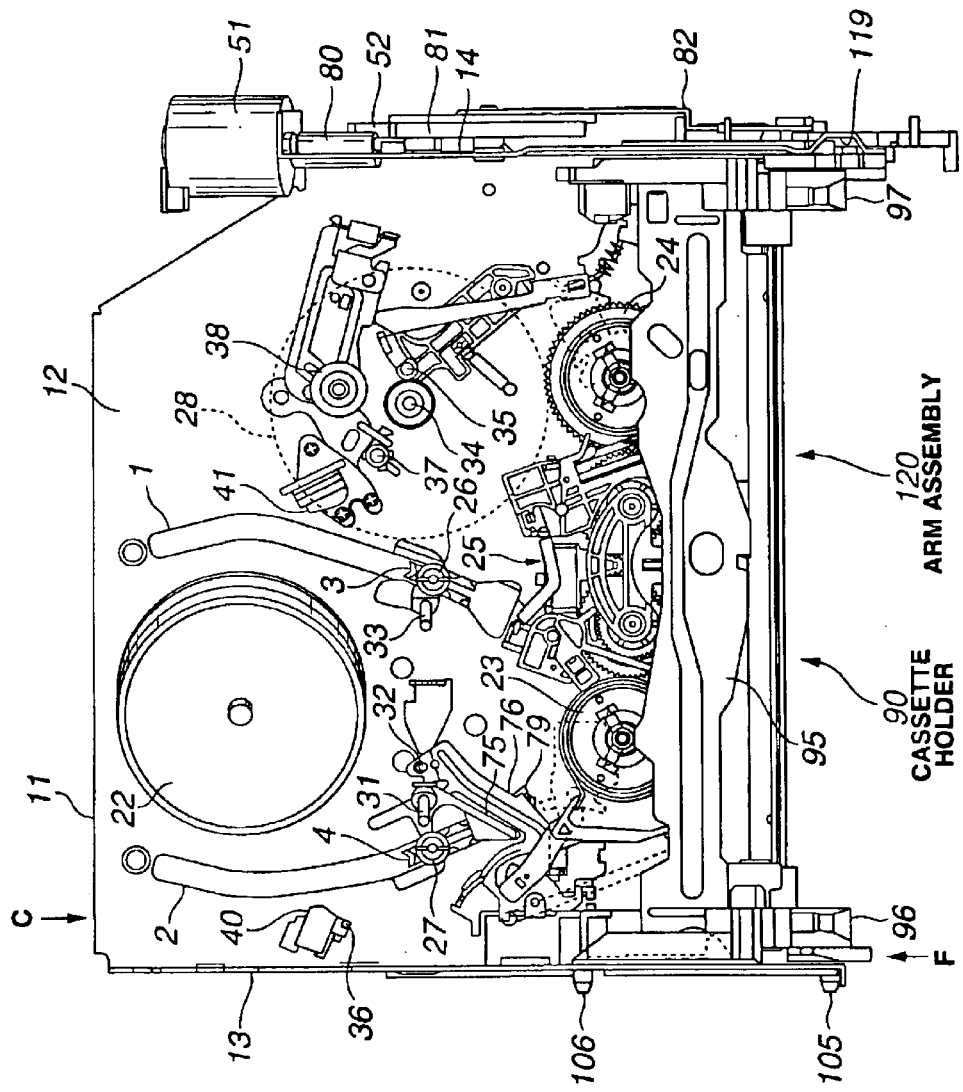
FIG. 1 is a plan view, when viewed from the top, of a magnetic recording reproducing apparatus in which the base, drum, and drum mounting unit of a magnetic recording reproducing apparatus in accordance with one preferred embodiment of the present invention.
Figure 2:
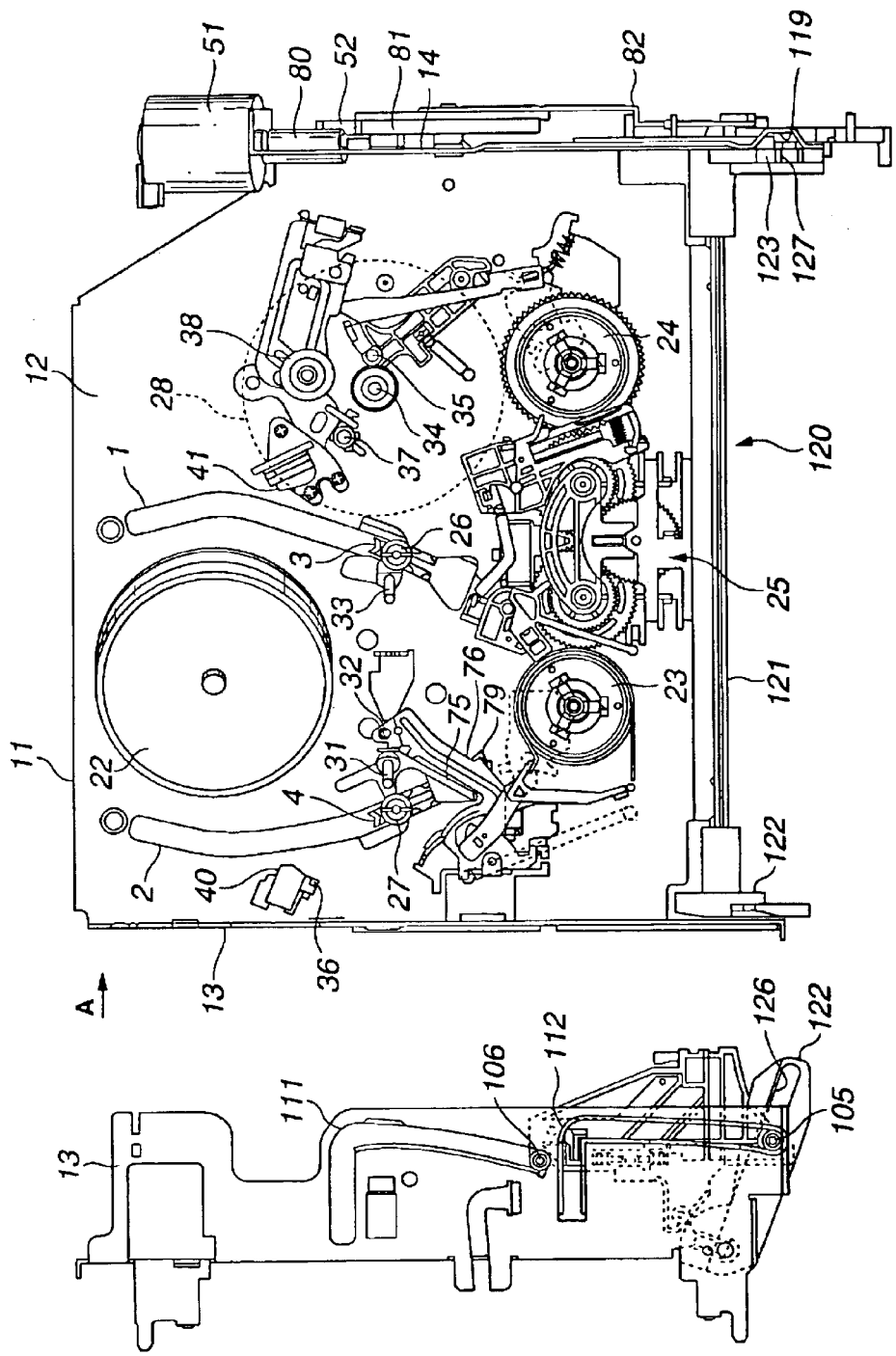
FIG. 2A is a plan view, when viewed from the top, of the magnetic recording reproducing apparatus shown in FIG. 1, in which a cassette holder is taken off.
FIG. 2B is a side view, when viewed from the direction of A in FIG. 2A, of the magnetic recording reproducing apparatus.
Figure 3:
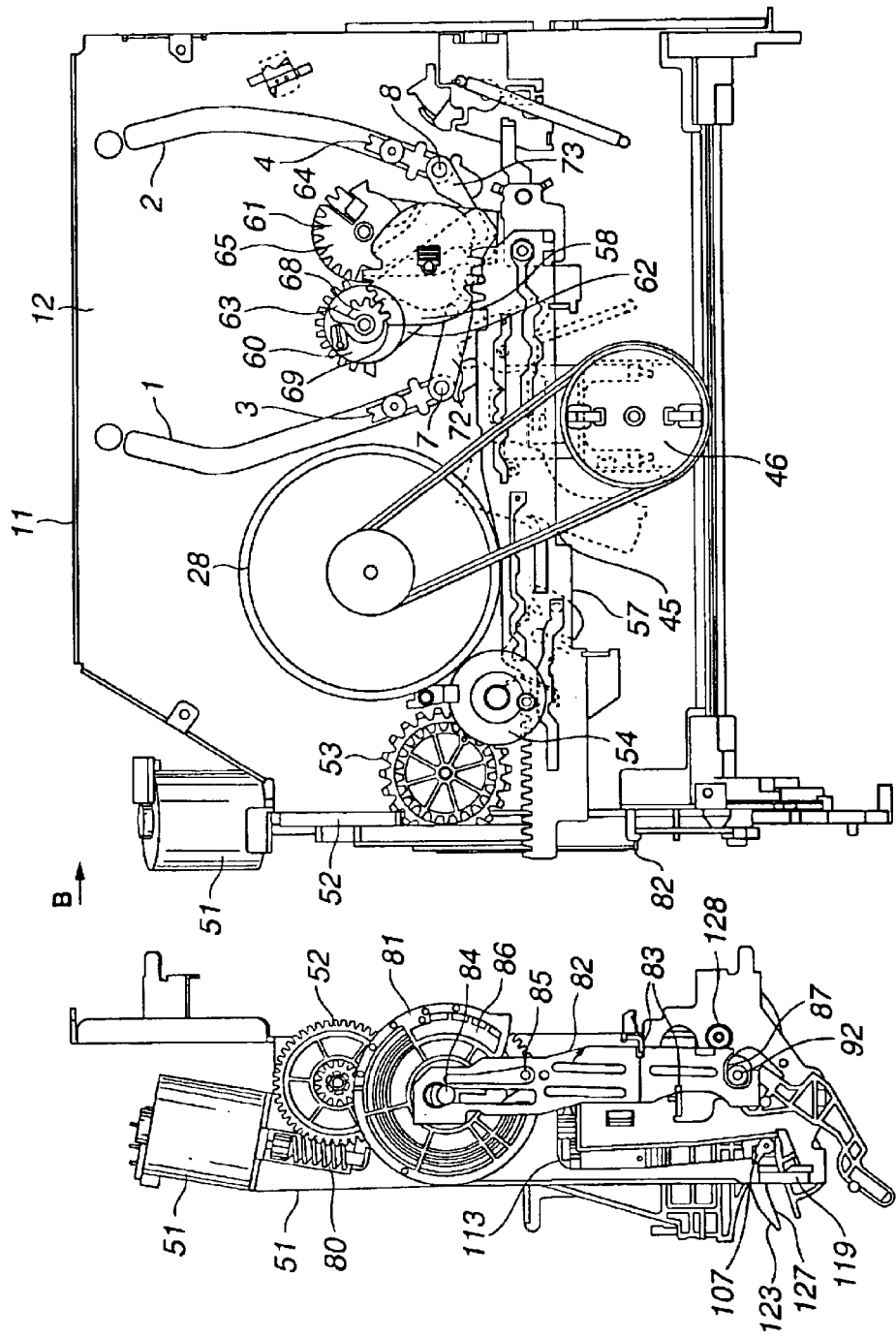
FIG. 3A is a back view, when viewed from the back in FIG. 1, of the magnetic recording reproducing apparatus.
FIG. 3B is a side view, when viewed from the direction of B in FIG. 3A, of the magnetic recording reproducing apparatus.
Figure 4:
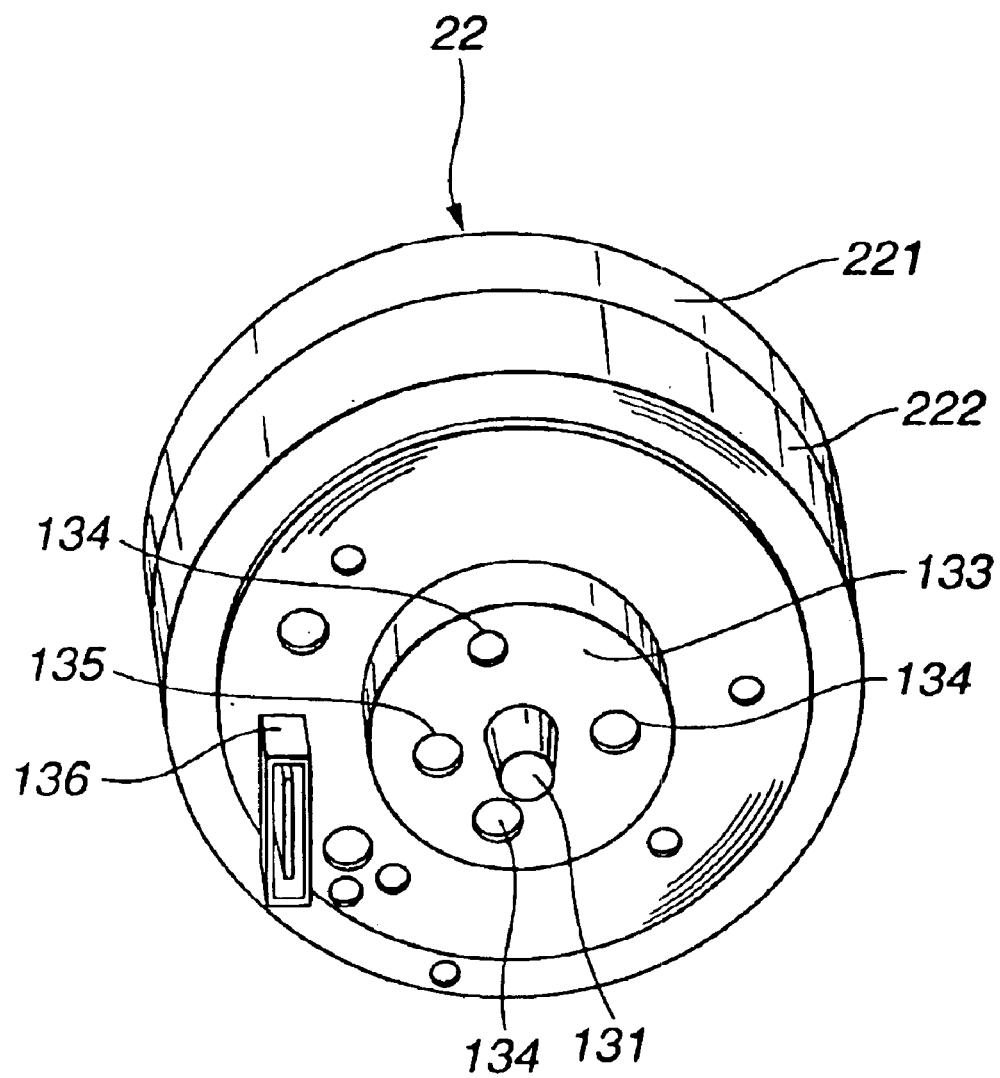
FIG. 4 is a perspective view to specifically show the drum in FIG. 1 when viewed from the base side.
Figure 5:
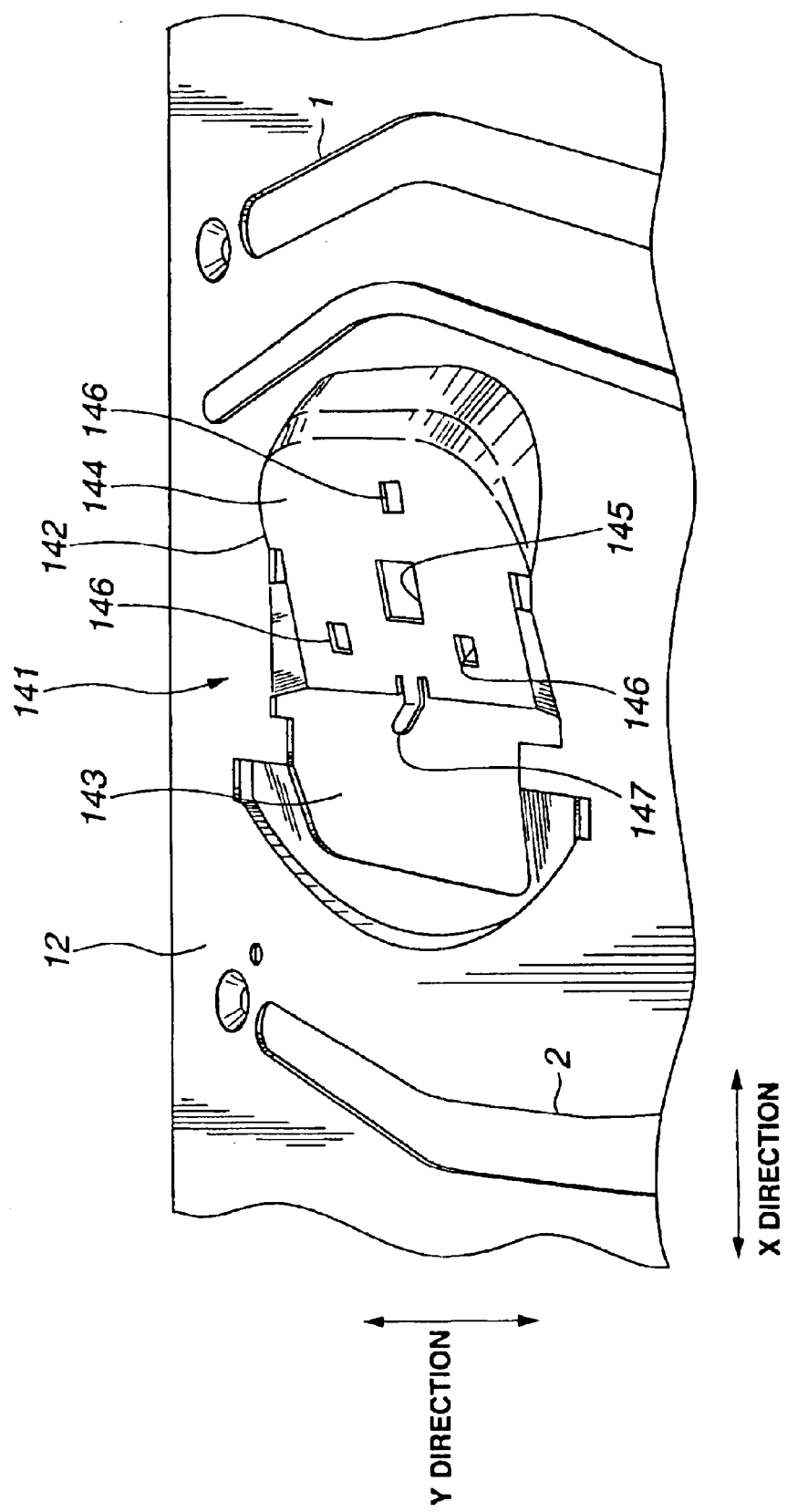
FIG. 5 is a perspective view to show the vicinity of the drum mounting portion of the base 12 in FIG. 1.
Figure 6:
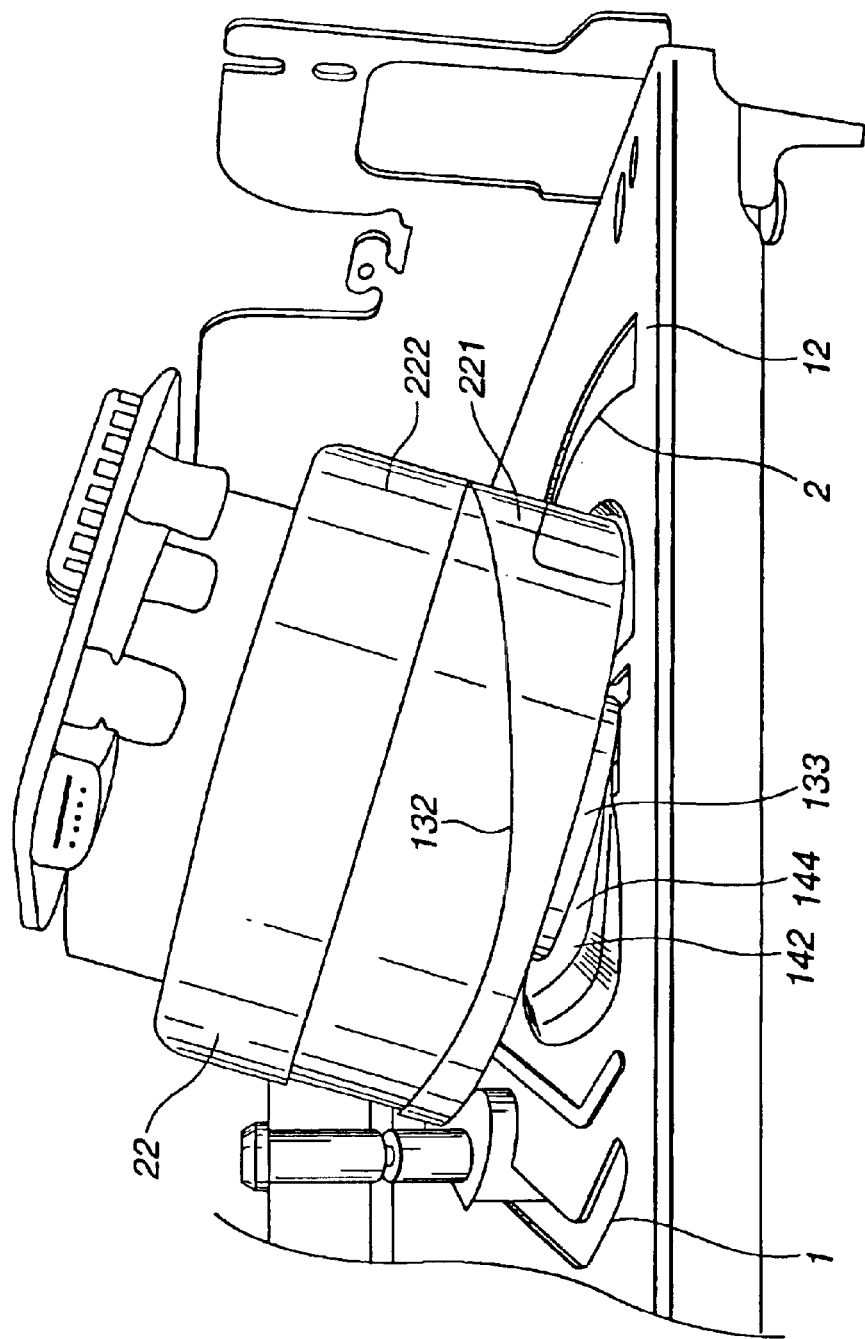
FIG. 6 is a perspective view, when viewed from the direction of C in FIG. 1, to show the vicinity of the portion where the drum is mounted.
Figure 7:
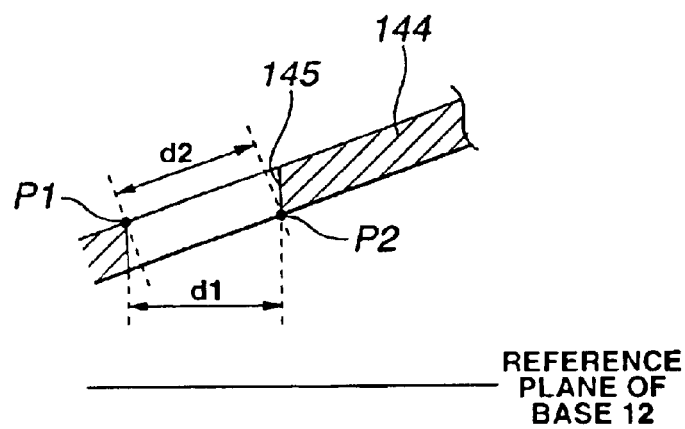
FIG. 7 is an illustration to show how to make a mounting hole in FIG. 5.

Preferred embodiments of the present invention will be hereinafter described in detail with reference to the drawings. FIG. 1 is a plan view, when viewed from the top, of a magnetic recording reproducing apparatus in which the base, drum, and drum mounting unit of a magnetic recording reproducing apparatus in accordance with one preferred embodiment of the present invention. FIG. 2A is a plan view, when viewed from the top, of the magnetic recording reproducing apparatus shown in FIG. 1, in which a cassette holder is taken off. FIG. 2B is a side view, when viewed from the direction of A in FIG. 2A, of the magnetic recording reproducing apparatus. FIG. 3A is a back view, when viewed from the back in FIG. 1, of the magnetic recording reproducing apparatus. FIG. 3B is a side view, when viewed from the direction of B in FIG. 3A, of the magnetic recording reproducing apparatus. FIG. 4 is a perspective view to specifically show the drum in FIG. 1 when viewed from the base side. FIG. 5 is a perspective view to show the vicinity of the drum mounting portion of the base 12 in FIG. 1. FIG. 6 is a perspective view, when viewed from the direction of C in FIG. 1, to show the vicinity of the portion where the drum is mounted. FIG. 7 is an illustration to show how to make a mounting hole in FIG. 5.

In the present preferred embodiment, a drum mounting portion can be formed by one normal-feed press working without decreasing the mounting accuracy of the drum by optimally mount the drum on the base.

In FIG. 1, FIG. 2A, FIG. 2B, FIG. 3A, and FIG. 3B, the chassis 11 has the base 12 and both sides (guide plates) 13, 14 of the base. A drum 22 is mounted on the base 12. The drum 22 is composed of a fixing portion and a rotary portion and the fixing portion is mounted on the chassis 11 at a predetermined angle to rotatably support the rotary portion.

In a tape cassette (not shown), there are provided a supply hub and a take-up hub (both not shown) and a tape is reeled around the hubs and is stored in a tape cassette. On the base 12, a supply reel disk 23 and a take-up reel disk 24 are rotatably mounted on the shafts implanted in the base 12. When a cassette is loaded, the supply hub and the take-up hub of the tape cassette are retained by the supply reel disk 23 and the take-up reel disk 24. The rotation of a capstan motor 28 is transmitted to the supply reel disk 23 and the take-up reel disk 24 via a gear box 25 to drive them according to a motion mode.

When the cassette loading is finished, the tape cassette is arranged at a position where the surface of the tape cassette from which the tape is taken out faces the peripheral surface of the drum 22 by a cassette loading mechanism described below.

On the other hand, a pair of guide grooves 1, 2 for guiding sliders 3, 4, which are tape pulling-out members, are formed in the base 12 from the vicinity of the position of the cassette holder 90 when the cassette loading is finished to the vicinity of the rear end of the drum 22 by way of the vicinity of the front end of the drum 22. The sliders 3, 4 are driven by a driving mechanism described below and are guided by the guide grooves 1, 2 and are freely slid between the base end side positions of the guide grooves 1, 2 in the vicinity of the front end of the cassette holder 90 and the end side positions of the guide grooves 1, 2 in the vicinity of the rear end of the drum 22

Each of the sliders 3, 4 is provided with a rotatable guide roller 26, 27 mounted on the shaft having a flange and a tilt post 33, 31. When the tape cassette is inserted into the deck and is being moved by a front loading mechanism, the guard panel of the tape cassette is opened and when the cassette loading is finished, the sliders 3, 4 are positioned at the reverse surface side (opposite to the magnetic recording surface) of the tape in a cassette half.

When the cassette loading is finished, the supply hub and the take-up hub become freely rotatable and are capable of pulling out the tape from the tape cassette. The tape loading is finished when the sliders 3, 4 move along the guide grooves 1, 2 from the position where the guide rollers 26, 27 and tilt posts 33, 31 of the sliders 3, 4 are in contact with the peripheral surface of the rear end side of the tape in the cassette half to the rear end side of the drum 22. In this way, the tape is pulled out from the tape cassette and is reeled around the drum 22.

In the state where the tape loading is finished, the tape is guided along the following running path: the direction of the tape is changed by the tilt post 31 after the guide roller 27; then, the tape is put into contact with the side of the drum 22 approximately 180 degrees; then, the direction of the tape is changed in the original direction by the tilt post 33; and thereafter, the tape is carried to the guide roller 26.

Further describing the running path in detail, on the running path of the tape are provided various kinds of poles for regulating the running path and various kinds of heads for performing the magnetic recording and reproducing. A tension pole 32, a capstan 34, and a guide pole 35 are disposed such that they face the reverse surface of the tape looped around the supply hub and the take-up hub in the cassette when the cassette loading is finished, and the tension pole 32 and the guide pole 35 move according to the operating state of the chassis 11 including the tape loading to control the running of the tape. Also, the capstan 34 is driven by a capstan motor 28 and pinches the tape with a pinch roller 38 to run the tape.

Also, on the side of the guide groove 2 are arranged a width-wide erasing head 40 and a guide pole 36, and on the side of the guide groove 1 are arranged an ACE head 41 for forming a voice track and a control track and a guide pole 37.

Therefore, in the state where the tape loading is finished, the tape is pulled out of the supply hub of the cassette and is reeled around the peripheral surface of the drum 22 by way of the guide pole 36, the width-wide erasing head 40, the guide roller 27, and the supply side tilt post 31 and further is reeled by the tale-up hub via the take-up side tilt post 33, the guide roller 26, an ACE head 41, a guide pole 37, between the capstan 34 and the pinch roller 38, and a guide pole 35.

A tension pole 32 moves with the slider 4 when the slider 4 moves and moves near to the guide pole 36 while the slider 4 is moving and comes in contact with the reverse surface of the tape to adjust the tension of the tape. Further, when the tape loading is finished, the pinch roller 38 moves to the capstan 34 side to press the tape onto the peripheral surface of the capstan 34.

The pinch roller 38 is freely rotated and is rotated by the capstan 34 with interposition of the tape when the capstan 34 is rotated according to the rotation of the capstan motor 28, whereby the tape can be carried. As shown in FIG. 3A and FIG. 3B, the rotation of the capstan motor 28 is transmitted also to a pulley clutch 46 via a belt 45. The pulley clutch 46 transmits the rotational force of the capstan motor 28 through a gear box 25 to the supply reel disk 23 or the take-up reel disk 24 according to the operation mode to reel the tape carried by the capstan 34 and the pinch roller 38 around either of the two hubs of the cassette.

The tape is loaded by using the rotational force generated by the loading motor 51 arranged on the side 14 of the chassis 11. The rotational force generated by the loading motor 51 is transmitted to a worm gear 80. A rotatable worm wheel 52 is mounted on the side of the chassis 11 and a joint gear 53 engaging with the worm wheel 52 is rotatably mounted on the rear surface of the base 12. Further, on the reverse surface of the base 12 is rotatably mounted a cam switch driving gear 54 engaging with the joint gear 53. The rotational force of the loading motor 51 is transmitted to the cam switch driving gear 54 via the worm gear 80, the worm wheel 52, and the joint gear 53.

A slider cam 57 is slidably mounted on the hooks 55, 56 fixed to the reverse surface of the base 12. The slider cam 57 is a plate-shaped member having a shape according to the mode and the teeth linearly formed on one end of the slider cam 57 is engaged with the cam switch driving gear 54. The slider cam 57 is driven so as to move to a horizontal position according to the rotation of the cam switch driving gear 54.

A rotatable loading driving gear 58 is mounted between the base end sides of the guide grooves 1 and 2 in the vicinity of a shaft 59 implanted in the base 12. The loading driving gear 58 is engaged with a rack formed linearly on the other end side of the slider cam 57 and is rotated according to the linear movement of the slider cam 57. A first arm 60 and a second arm 61 are arranged between the guide grooves 1 and 2 opposite to the engaging portion of the loading driving gear 58 with the slider cam 57.

The first arm 60 and the second arm 61 are rotatably mounted on the shafts 66, 67 implanted in the base 12. The first arm 60 has a gear portion 63 shaped like a disk, part of which is toothed, and an arm portion 62 integrally formed with the gear portion 63. The second arm 61 has a gear portion 65 shaped like a disk, part of which is toothed, and an arm portion 64 integrally formed with the gear portion 65. The gear portions 63, 65 are constituted such that they are engaged with each other and are rotated in the opposite directions.

An integrally formed cutaway gear 68 is mounted concentrically with the gear portion 63 on the surface of the gear portion 63. The cutaway gear 68 is engaged with the teeth 69 formed on a part of the outer periphery of the loading driving gear 58. When the loading driving gear 58 rotates, the gear portion 63 is rotated and further the gear portion 65 is also rotated.

One ends of respective connecting members 72, 73 are supported, by means of shafts, by the tip ends of the arm portions 62, 64 such that they can freely swing. The other ends of the respective connecting members 72, 73 are supported, by means of shafts, by the retaining portions 7, 8 formed on the rear ends of the respective sliders 3, 4. The arm portions 62, 64 of the first and second arms 60, 61 are constituted such that tip end sides thereof are located in the vicinity of the base end sides of the guide grooves 1, 2 the tip end sides of near and the sliders 3, 4 are constituted such that they stop at the base end sides of the guide grooves 1, 2 when the loading driving gear 58 is at the end position of rotation at the beginning of the tape loading.

Here, a stopping member 75 projecting to the obverse surface side of the base 12 is integrally formed with the slider 4 and the stopping member 75 is in contact with the tension arm 76 in the state where the sliders 3, 4 are near to the base end sides of the guide grooves 1, 2. A projecting unloading stopper 79 is mounted on the surface of the base 12 and prevents the tension arm 76 from moving in the unloading direction of the slider 4. That is, since the slider 4 stops in the state where the stopping member 75 is in contact with the tension arm 76 and the unloading stopper 79, the positions of the guide roller and the tape guide are regulated when the tape caste is unloaded.

A loading motor 51 drives not only a tape loading mechanism but also a cassette loading mechanism and on the side 14 of the chassis 11 is rotatably mounted a front loading cam gear (hereinafter referred to as an "FL cam gear") 81 engaged with the worm wheel 52. The rotational force of the loading motor 51 is transmitted to the FL cam gear 81 via the worm gear 80 and the worm wheel 52.

A front loading driving slider (hereinafter referred to as an "FL driving slider) 82 is slidably mounted on a hook 83 fixed to the side 14 of the chassis 11 and the retainer 84 of the tip end of the rotary shaft of the FL cam gear 81.

The FL driving slider 82 is a plate-shaped member having a shape according to the mode and a guide pole 85 is implanted therein toward the surface side of the FL cam gear 81. On the surface of the FL cam gear 81 is formed a guide groove 86 and since the guide pole 85 implanted in the FL cam gear 81 is fitted in and slid in the guide groove 86, the FL driving slider 82 is slid according to the rotation of the FL cam gear 81. On the end portion of the FL driving slider 82 is formed a cutaway 87 to be retained by the retainer 92 of an arm assembly 120.

The arm assembly 120 freely swings around a shaft 128 fixed to the side 14 of the chassis 11 and when the FL driving slider 82 is slid to move the retainer 92 back and forth in the direction of the chassis 11, the arm assembly 120 is swung around the shaft 128. The guide post 107 of the cassette holder 90 is inserted into the retaining groove 127 of the arm assembly 120 and the cassette holder 90 is driven in the horizontal direction and in the vertical direction by the swing of the arm assembly 120.

The cassette holder 90 is composed of a bottom plate 95 and left and right brackets 96, 97 which are connected to the bottom plate 95. A pair of guide posts 105, 106 are implanted at a front and a back position in the left bracket 96 and a guide post 107 is implanted in the right bracket 97.

A pair of guide grooves 112, 111 into which the guideposts 105, 106 are slidably inserted, respectively, are formed in the side 13 of the chassis 11 so as to carry the cassette holder 90 in the horizontal direction and in the vertical direction. Also, in the side 14 of the chassis 11 is formed one guide groove 113 into which the guide post 107 is slidably inserted.

The guide grooves 111, 112, 113 are formed through both the sides 13, 14 of the chassis 11 and are extended in the horizontal direction in the upper side of the sides 13, 14 and downward in the vertical direction in the rear end side of the chassis 11. When the guide posts 105, 106 are inserted into guide grooves 112, 111, respectively, and the guide post 107 is inserted into the guide groove 113, the guide posts 106, 105, 107 are moved along the guide grooves 111, 112, 113 to move the cassette holder 90 in the horizontal direction from the cassette entry side and further downward in the vertical direction at the rear end side of the chassis 11 to position the bottom plate 95 of the cassette holder 90 near the base 12.

In order to carry the cassette holder 90 in the horizontal direction and further downward in the vertical direction to press it onto the chassis 11, the arm assembly 120 is adopted. The arm assembly 120 is composed of a plate 121, a left bracket 122, and a right bracket 123. The plate 121 is a flat plate and is constituted such that when its both ends are inserted into the retaining portions 124, 125 of the brackets 122, 123, the left bracket 122 is connected to the right bracket 123.

In the left bracket 122 is formed a retaining groove 126 into which the guide post 105 of the left bracket 96 of the cassette holder 90 is inserted. The retaining groove 126 is formed in a slim shape in accordance with the horizontal and vertical movements of the guide post 105. That is, the guide post 105 of the cassette holder 90 is inserted into retaining groove 126 of the arm assembly 120 and the guide groove 112 formed in the side 13 of the chassis 11 at the same time.

On the other hand, in the right bracket 123 is formed a retaining groove 127 into which the guide post 107 of the right bracket 97 of the cassette holder 90 is inserted. The retaining groove 127 is formed in a slim shape in accordance with the horizontal and vertical movements of the guide post 107 and has an opening into which the guide post 107 is inserted in the upper portion. That is, the guide post 107 of the cassette holder 90 is inserted into retaining groove 127 of the arm assembly 120 and the guide groove 113 formed in the side 14 of the chassis 11 at the same time. As described above, since the retaining portion 92 is moved back and forth in the direction of the chassis 11 by the FL driving slider 82, the arm assembly 120 swings around the shaft 128 fixed to the side 14 of the chassis 11.

Here, in the state where the longitudinal side of the bracket 123 is approximately parallel to the base 12, the guide post 107 in the retaining groove 127 is pressed onto the base 12 side by a predetermined urging member, whereby the tape cassette is pressed onto the base 12 side when the cassette loading is finished.

In FIG. 4 to FIG. 6, the drum 22 is composed of a fixing portion 221 having a mounting portion 133 and a rotary portion 222 which are rotatably disposed around the shaft 131 with respect to the fixing portion 221. On the peripheral surface of the fixing portion 221 of the drum 22 is formed a lead 132 to guide the running of the tape. A head not shown is arranged around the peripheral surface of the rotary portion 222 of the drum 22 such that it projects from the peripheral surface of the rotary portion 222 of the drum 22 and is rotated with the rotation of the rotary portion 222 to trace the tape running around the peripheral surface of the drum 22 to perform magnetic recording and reproducing.

At the center of the bottom of the fixing portion 221 of the drum 22 is formed a mounting portion 133 where the drum 22 is mounted on the base 12. The mounting portion 133 is shaped like a cylindrical column having one plane fixed to the bottom of the fixing portion 221 and the other plane (hereinafter referred to as "plane of the mounting portion 133") having a shaft 131 at he center thereof and perpendicular to the axial direction of the shaft 131. The drum 22 is mounted on a tilt stand 142 at the plane of the mounting portion 133. Here, the size of the plane of the mounting portion 133 is smaller than the size of the bottom of the fixing portion 221 of the drum 22.

The shaft 131 has a portion projecting from the center of the plane of the mounting portion 133 on the bottom side of the fixing portion 221 of the drum 22. In the plane of the mounting portion 133 are formed three screw holes 134 for mounting the drum 22 on the base 12. Further, in the plane of the mounting portion 133 is formed a provisional screw hole 135 for provisionally mounting the drum 22. The drum 22 is positioned in the angular direction by the three screw holes 134. Here, instead of the provisional screw hole 135, a cutaway may be formed at the position and in a shape corresponding to the cut and bent portion 147 described below on the end portion of the plane of the mounting portion 133.

In the present preferred embodiment, as described below, the drum 22 is mounted with reference to the center. That is, the drum 22 is positioned in a mounting plane with the projecting portion of the shaft 131 of the mounting portion 133 at the center and is positioned in the angular direction by the use of the screw holes 134. Since the screw holes 134 are formed near the shaft 131 of the mounting portion 133, that is, at positions comparatively short distance away from the projecting portion of the shaft 131, that is, the rotational center of the drum 22, when the drum 22 is mounted by the use of the screw holes 134, even if the surface accuracy of the mounting surface 144 of the base 12 is relatively low, the linearity of the lead 132 can be sufficiently ensured.

Also, on the peripheral portion of the bottom of the fixing portion 221 of the drum 22 is mounted a connector 136 for electrically connecting the electric circuit of the drum 22 to a printed wiring board (not shown) arranged on the reverse surface side of the base 12.

A drum mounting portion 141 is formed between the guide grooves 1, 2 on the base 12. In the present preferred embodiment, the drum mounting portion 141 is formed by one normal-feed press working and has an opening 143 for arranging the connector 136 fixed to the drum 22 and the tilt stand 142.

The tilt stand 142 has, on the obverse surface thereof, a mounting surface 144 tilted at a predetermined angle with respect to the reference surface of the base 12. The tilting direction of the mounting surface 144 is the left and right direction of the chassis 11 (in the direction of X shown by an arrow in FIG. 5). The tilt stand 142 has a portion lower than the reference surface of the base 12 on the guide groove 2 side and a portion higher than the reference surface of the base 12 on the guide groove 1 side. Also, the size of the mounting surface 144 corresponds to the size of the mounting portion 133 of the drum 22 and sufficiently smaller than the size of the bottom of the drum 22. Therefore, the height of the tilt stand 142 is comparatively small to reduce the load of bending in the press machine.

Also, since the size of the tilt stand 142 is small, the opening 143 in which the connector 136 is disposed can be formed at the lower side of the mounting surface 144 of the tilt stand 142, that is, between the tilt stand 142 and the guide groove 2 in the left and right direction of base 12 (in the direction of X shown by an arrow), which extremely increases flexibility in design.

In the mounting surface 144 of the tilt stand 142 are formed a shaft mounting hole 145 into which the shaft 131 of the drum 22 is inserted, and three mounting holes 146 through which screws are screwed into the screw holes 134 of the drum 22. These mounting holes 145, 146 are formed at the positions corresponding to the shaft 131 and the screw hole 134 of the drum 22.

In the present preferred embodiment, the tilt stand 142 is formed by one normal-feed press working and these mounting holes 145, 146 are also made by punching the base 12 in the vertical direction, as is the case with the other portions of the base 12. That is, the mounting hole 146 is a rectangular hole having one side whose length is equal to the diameter of the screw screwed thereinto in the direction perpendicular (in the back and forth direction of the base 12, that is, in the direction of Y shown by an arrow in FIG. 5) to the tilting direction of the mounting surface 144 (direction shown by an arrow X) and the other side having a predetermined length in the direction of X. Also, the shaft mounting hole 145 is a rectangular hole having one side whose length is equal to the diameter of the shaft 131 in the direction of Y and the other side having a length corresponding to the diameter of the shaft 131 in the direction of X.

FIG. 7 is an illustration to show the punching of the shaft mounting hole 145, that is, a cross sectional view of the mounting surface 144 at the position of the shaft mounting hole 145.

The mounting surface 144 is formed at a predetermined angle with respect to the reference plane of the base 12. A rectangular hole 145 larger than the diameter of the shaft 131 of the drum 22 in the direction of X is punched out at the predetermined position in the mounting surface 144 in the vertical direction with respect to the reference plane of the base 12. A reference character d1 designates the length of a side in the direction of X of the rectangular hole 145 formed by punching and a reference character d2 designates the diameter of the shaft 131.

The shaft 131 is mounted on the mounting surface 144 with its axis perpendicular to the mounting surface 144. The length d1 of the side in the direction of X of the shaft mounting hole 145 is determined based on the points P1, P2 on the obverse surface and reverse surface of the mounting surface 144 where the shaft 131 is put into contact with the internal surface of the mounting hole 145. In this way, the shaft 131 is positioned in the direction of X by these points P1, P2 of the mounting hole 145. Further, the length of a side in the direction of Y of the shaft mounting hole 145 is made to agree with the diameter d2 of the shaft 131, whereby the shaft 131 is positioned also in the direction of Y by the shaft mounting hole 145.

In this manner, the elongated holes (rectangular holes) are punched in the mounting surface 144 in the vertical direction with respect to the reference plane to form the respective mounting holes 145, 146: that is, the mounting surface 144 and the respective mounting holes 145, 146 can be made by one stroke of the press machine.

A cut and bent portion 147 is formed at the position corresponding to the provisional mounting hole 135 of the drum 22 at the bottom end of the mounting surface 144. The cut and bent portion 147 is formed by cutting and bending the bottom end of the mounting surface 144. An opening 143 is formed at the position corresponding to the connector 136 of the drum 22 to expose the connector 136 to the reverse surface side of the base 12 through the opening 143 when the drum 22 is mounted on the mounting surface 144.

Figure 8:
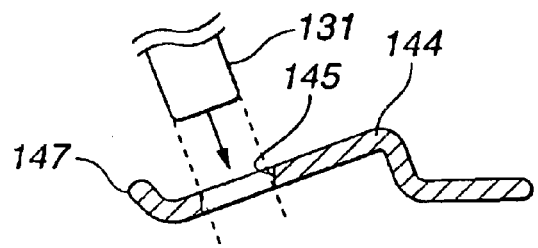
FIG. 8 is an illustration to show the operation of a preferred embodiment.
Figure 9:
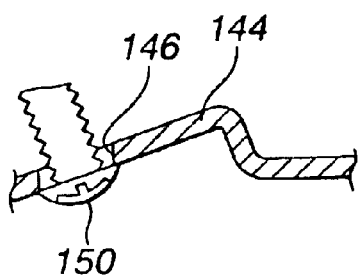
FIG. 9 is an illustration to show the operation of a preferred embodiment.

Next, the operation of the preferred embodiment constituted in this manner will be described with reference to FIG. 8 and FIG. 9. FIG. 8 and FIG. 9 are illustrations to show the mounting of the shaft 131 or a screw 150 in the respective mounting holes 145 or 146.

The base 12 is formed by one normal-feed press working. For example, the tilt stand 142 is formed by bending and the mounting holes 145, 146 and the opening 143 are formed by vertical punching. The tilt stand 142 is formed by one press process and hence the number of processes can be decreased. Also, the tilt stand 142 is small in size in correspondence to the size of the mounting portion 133 of the drum 22 and hence the tilt stand 142 is small also in height, which results in reducing the load of bending in the press machine.

Further, the opening 143 for arranging the connector 136 can be formed in the left and right direction (in the direction of X) of the chassis 11 with respect to the tilt stand 142, which results in extremely increasing the flexibility of design.

The drum 22 is mounted on the pressed tilt stand 142 of the base 12 shown in FIG. 5. First, the shaft 131 of the drum 22 is inserted into the shaft mounting hole 145 formed in the mounting surface 144 of the tilt stand 142. FIG. 8 shows the direction into which the shaft 131 is inserted. Since the length of the side in the direction of Y of the shaft mounting hole 145 is set at the diameter of the shaft 131, when the shaft 131 is inserted into the mounting hole 145, the shaft 131 is positioned in the direction of Y. Further, when the shaft 131 is vertically inserted into the mounting hole 144, the shaft 131 is put into contact with the inner surface of the mounting hole 145 at the obverse surface and the reverse surface of the mounting surface 144 to be positioned also in the direction of X on the mounting surface 144.

In this way, in the present preferred embodiment, the shaft 131 is surely mounted at a predetermined position in the horizontal direction. The shaft 131 is the rotational center of the drum 22 and hence the drum 22 is mounted in the mounting plane with high accuracy.

When the shaft 131 is inserted into the mounting hole 145, the angular direction of the drum 22 is adjusted such that the cut and bent portion 147 of the base 12 is retained by the provisional mounting hole 135 of the drum 22. In this state, three mounting holes 146 formed in the mounting surface 144 of the tilt stand 142 face the respective screw holes 134 formed in the mounting portion 133 of the drum 22, which facilitates a screwing work. Moreover, since the cut and bent portion 147 is formed by cutting and bending the base 12, it can be easily formed by press working.

Next, as shown in FIG. 9, screws 150 are inserted into the respective mounting holes 146 and are screwed into the respective screw holes 134. Since the length of the side in the direction of Y of the mounting hole 146 is set at the diameter of the screw 150, when the screws 150 are screwed into the respective screw holes 134 through the mounting hole 146, the drum 22 is positioned in the angular direction. Here, the mounting hole 146 has a side larger than the diameter of the screw 150 in the direction of X and hence the screws 150 can easily screwed.

The position of the drum 22 in the mounting plane is set with high accuracy by the use of the shaft 131 and the drum 22 is fixed with screws arranged at positions comparatively short distance away from the rotational center of the drum 22, whereby the drum 22 is positioned in the angular direction. Since the drum 22 is fixed with screws arranged at positions comparatively short distance away from the rotational center of the drum 22, even if the surface accuracy of the mounting surface 144 of the tilt stand 142 is comparatively low, fixing the drum 22 with screws has extremely little effect on the linearity of the lead 132.

Further, since the connector 136 for electrical connection can be exposed to the reverse surface side of the base 12 between the drum 22 and the guide groove 2 by selecting the shape and size of the tilt stand 142, the area of the base 12 can be effectively utilized to increase the flexibility of design.

In the present preferred embodiment as described above, the tilt stand and the respective mounting holes are formed by one normal-feed press process, which can reduce the number of processes. In order to form the base by one normal-feed press process, the respective mounting holes are formed by vertical punching. Even in this case, by positioning the mounting holes by the obverse surface and reverse surface of the tilting mounting surface, the positioning accuracy of the mounting hole can be ensured also in the direction of X. Moreover, since the drum is positioned in the mounting plane with respect to the center by the use of the shaft of the drum and is positioned in the angular direction by the use of the mounting holes near the shaft, the mounting accuracy of the drum is sufficiently high and even if the surface accuracy of the mounting surface is low, the linearity of the lead can be ensured. Further, since the drum is provisionally positioned by the simple cut and bent portion formed by cutting and bending the base, the drum can be easily mounted. Still further, since the tilt stand can be reduced in size, the pressing load of the press machine can be reduced and the tilt stand can be formed with high accuracy. Still further, since the opening of the base can be reduced in size, the strength of the base can be increased.

While the present invention has been described in terms of specific preferred embodiment set forth in detail, it should be understood that other modifications may be made based on the present invention in the wide range without departing from the spirit and scope of the present invention. The present invention is never limited to the specific preferred embodiment except that it is limited by the appended claims.

What is claimed is:

1. A base of a magnetic recording reproducing apparatus, said base comprising a tilt stand integrally formed with the base and having a mounting surface tilted to mount a drum thereon, wherein the mounting surface has a shaft mounting hole which is formed to be of a size corresponding to the size of the shaft of the drum and into which the shaft of the drum is inserted to regulate the position of the shaft of the drum.

2. A base of a magnetic recording reproducing apparatus according to claim 1, further comprising at least one mounting hole formed in the mounting surface in the range of a diameter smaller than the diameter of the drum from the shaft mounting hole to mount the drum.

3. A base of a magnetic recording reproducing apparatus, said base comprising:
    a tilt stand integrally formed with the base and having a mounting surface tilted to mount a drum thereon; and
    a cut and bent portion which is formed by cutting and bending the base and which is provided to the tilt stand such as to be tilted upwards from the mounting surface to retain the drum mounted on the tilt stand to provisionally fix the drum.

4. A drum mounting unit of a magnetic recording reproducing apparatus, said drum mounting unit comprising:
  a tilt stand formed on a base;
  a cut and bent portion formed such as to be tilted upwards from the mounting surface on the tilt stand by cutting and bending the base; and
  a retaining portion having a shape corresponding to the cut and bent portion,
  wherein the drum is provisionally mounted on the tilt stand by making the retaining portion retain the cut and bent portion.

* * * * *